(12) United States Patent
Nam

(10) Patent No.: US 10,864,445 B2
(45) Date of Patent: Dec. 15, 2020

(54) METHOD FOR DETECTING ABNORMAL GAME PLAY

(71) Applicant: Kakao Games Corp., Gyeonggi-do (KR)

(72) Inventor: Dohyeong Nam, Gyeonggi-do (KR)

(73) Assignee: KAKAO GAMES CORP., Gyeonggi-Do (KR)

( * ) Notice: Subject to any disclaimer, the term of this patent is extended or adjusted under 35 U.S.C. 154(b) by 0 days.

(21) Appl. No.: 16/515,840

(22) Filed: Jul. 18, 2019

(65) Prior Publication Data

US 2020/0114265 A1    Apr. 16, 2020

(30) Foreign Application Priority Data

Oct. 16, 2018  (KR) .......................... 10-2018-0123267

(51) Int. Cl.
  *A63F 13/73*    (2014.01)
  *A63F 13/35*    (2014.01)

(52) U.S. Cl.
  CPC .............. *A63F 13/73* (2014.09); *A63F 13/35* (2014.09)

(58) Field of Classification Search
  CPC .......... A63F 13/70; A63F 13/71; A63F 13/73; A63F 13/75; A63F 13/77
  See application file for complete search history.

(56) References Cited

U.S. PATENT DOCUMENTS

2017/0266560 A1    9/2017  Harris et al.
2019/0291008 A1*   9/2019  Cox ....................... A63F 13/352

FOREIGN PATENT DOCUMENTS

| KR | 1020070119105 A | 12/2007 |
| KR | 100979092 B1 | 8/2010 |
| KR | 1020110069204 A | 6/2011 |
| KR | 1020160061856 A | 6/2016 |

OTHER PUBLICATIONS

Office Action for Korean Patent Application No. 10-2018-0123267 issued by Korean Intellectual Property Office dated Oct. 2, 2019; 6 pages.
Korean Office Action for Korean Patent Application No. 10-2018-01023267 dated Apr. 27, 2020; 5 pgs.

* cited by examiner

*Primary Examiner* — Omkar A Deodhar
(74) *Attorney, Agent, or Firm* — Umberg Zipser LLP

(57) ABSTRACT

Disclosed is a method for determining an abnormal game play. Operations stored in a computer program for processing the method include: computing a game play scene of a player using an abnormal game play determination model which includes one or more network functions; determining whether an abnormal pattern exists in the game play scene based on an output of the abnormal game play determination model; and determining whether a play of the player is abnormally performed based on whether an abnormal pattern exists in the game play scene.

12 Claims, 7 Drawing Sheets

METHOD FOR DETECTING ABNORMAL GAME PLAY

CROSS-REFERENCE TO RELATED APPLICATIONS

This application claims priority to and the benefit of Korean Patent Application No. 10-2018-0123267 filed in the Korean Intellectual Property Office on Oct. 16, 2018, the entire contents of which are incorporated herein by reference.

TECHNICAL FIELD

The present disclosure relates to a method for detecting a game play using a computing device, and more particularly, to a solution for detecting a game play which is abnormally played.

BACKGROUND ART

As an online game market becomes more active, information on a game play is also increasing. In a gaming community, information such as game hacking techniques, descriptions of game skills and items are coming up, and various methods for raising skills in a game are being discussed among game players.

Meanwhile, some game players use programs that hack game servers that can supplement skills thereof in a fraudulent way. The programs that hack the game servers are called game nuclei among game players. When the number of players using the game nuclei increases, players who do not use the game nucleus will not be able to show the skills in the game, and it will be more costly and time consuming for the player than the cost and time normally required to raise a level, and as a result, it is possible to reduce the interest of players who use the game nuclei in the game. Consequently, players who lost interest in the game leave the game, so there is a technical task in the art for a method for preventing users from abnormally performing the game.

Korean Patent Registration No. 10-0979092 discloses a game nuclear prevention method.

SUMMARY OF THE INVENTION

The present disclosure has been made in an effort to provide a method for determining a game which is abnormally played.

An exemplary embodiment of the present disclosure provides a computer program stored in a computer readable storage medium. When the computer program is executed by one or more processors of a computing device, the computer program performs operations for determining abnormal game play, and the operations may include: computing a game play scene of a player using an abnormal game play determination model which includes one or more network functions; determining whether an abnormal pattern exists in the game play scene based on an output of the abnormal game play determination model; and determining whether a play of the player is abnormally performed based on whether an abnormal pattern exists in the game play scene.

In an alternative exemplary embodiment of the computer program operations which allow the following operations for determining the abnormal game play to be performed, the game play scene may be at least a part of a game play image obtained with respect to game play of the player, and may be generated based on at least one of a predetermined action or a predetermined time unit.

In an alternative exemplary embodiment of the computer program operations which allow the following operations for determining the abnormal game play to be performed, the game play scene may include at least one of an entire game play scene displayed to the player, at least a part of a game play scene determined based on a genre of a game, at least a part of a game play scene determined based on game data or at least a part excluding game information from the game play scene.

In an alternative exemplary embodiment of the computer program operations which allow the following operations for determining the abnormal game play to be performed, the abnormal game play determination model may be trained with a first training data set composed of a normal game play scene to identify a pattern of a normal game play scene related to a normal game play, and detect whether an untrained pattern exists in the game play scene.

In an alternative exemplary embodiment of the computer program operations which allow the following operations for determining the abnormal game play to be performed, the abnormal game play determination model may train color pattern of a normal game play scene using the first training data set, and detect abnormal game play based on whether the untrained color pattern exists in the game play scene.

In an alternative exemplary embodiment of the computer program operations which allow the following operations for determining the abnormal game play to be performed, the abnormal game play determination model may train edge of an object of a normal game play scene using the first training data set, and detect abnormal game play based on whether the untrained edge pattern of an object exists with respect to the detected object in the game play scene.

In an alternative exemplary embodiment of the computer program operations which allow the following operations for determining the abnormal game play to be performed, the abnormal game play determination model may train an object of a normal game play scene and a color pattern of the object of the normal game play scene using the first training data set, and detect abnormal game play based on whether the untrained color pattern of the object exists with respect to the detected object on the game play scene.

In an alternative exemplary embodiment of the computer program operations which allow the following operations for determining the abnormal game play to be performed, the abnormal game play determination model may be trained with a second training data set including an abnormal game play scene to identify a pattern of an abnormal game play scene related to an abnormal game play, and detect whether a trained abnormal pattern exists in the game play scene.

In an alternative exemplary embodiment of the computer program operations which allow the following operations for determining the abnormal game play to be performed, the second training data set may include training data labeled as an abnormal object of the abnormal game play scene.

In an alternative exemplary embodiment of the computer program operations which allow the following operations for determining the abnormal game play to be performed, the abnormal game play determination model may extract positional information of an abnormal pattern on the game play scene, and detect abnormal game play based on a result of comparison between the positional information of the abnormal pattern and game data.

In an alternative exemplary embodiment of the computer program operations which allow the following operations for determining the abnormal game play to be performed, the abnormal game play determination model may include one or more abnormal game play determination submodels, in which the one or more abnormal game play determination submodel are trained to detect an abnormal pattern for each object which is identified with a third training data set, based on one or more objects included in a normal game play scene related to a normal game play, the third training data set includes a third training data subset composed of each normal object, and may detect one or more objects of the game play scene, and detect whether an untrained pattern exists in each of the objects by calculating each of the detected objects through the abnormal game play determination submodel.

Another exemplary embodiment of the present disclosure provides a method for determining an abnormal game play. The method may include: computing a game play scene of a player using an abnormal game play determination model which includes one or more network functions; determining whether an abnormal pattern exists in the game play scene based on an output of the abnormal game play determination model; and determining whether a play of the player is abnormally performed based on whether an abnormal pattern exists in the game play scene.

Still another exemplary embodiment of the present disclosure provides a computer device. The computing device may include: a processor including one or more cores; and a memory; in which the processor may be configured to: compute a game play scene of a player using an abnormal game play determination model which includes one or more network functions; determine whether an abnormal pattern exists in the game play scene based on an output of the abnormal game play determination model; and determine whether a play of the player is abnormally performed based on whether an abnormal pattern exists in the game play scene.

According to an exemplary embodiment of the present disclosure, a method for determining an abnormal game play can be provided.

DETAILED DESCRIPTION

Figure 1:
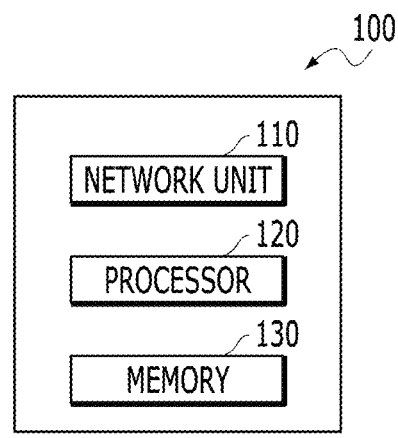
FIG. 1 is a block diagram of a computing device for performing an operation for determining an abnormal game play according to an exemplary embodiment of the present disclosure.

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to all of the case where X uses A, the case where X uses B, or the case where X uses both A and B. Further, it should be understood that the term "and/or" used in the specification designates and includes all available combinations of one or more items among enumerated related items.

It should be appreciated that the term "comprise" and/or "comprising" means that presence of corresponding features and/or components. However, it should be appreciated that the term "comprises" and/or "comprising" means that presence or addition of one or more other features, components, and/or a group thereof is not excluded. Further, when not separately specified or not clear in terms of the context that a singular form is indicated, it should be construed that the singular form generally means "one or more" in the present specification and the claims.

Those skilled in the art need to recognize that various illustrative logical blocks, configurations, modules, circuits, means, logic, and algorithm steps described in connection with the exemplary embodiments disclosed herein may be implemented as electronic hardware, computer software, or combinations of both sides. To clearly illustrate the interchangeability of hardware and software, various illustrative components, blocks, structures, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In an exemplary embodiment of the present disclosure, a server may include other components for performing a server environment of the server. The server may include all arbitrary types of devices. The server as a digital device may be a digital device with a calculation capability, which has a processor installed therein and a memory, such as a laptop computer, a notebook computer, a desktop computer, a web pad, or a mobile phone. The server may be a web server that processes a service. A type of server described above is just an example and the present disclosure is not limited thereto.

In the present specification, a network function may be used interchangeably with an artificial neural network and a neural network. In the present specification, the network function may include one or more neural networks and in this case, an output of the network function may be an ensemble of outputs of one or more neural networks.

In the present specification, a model may include the network function. The model may include one or more network functions and in this case, the output of the model may be an ensemble of the outputs of one or more network functions.

FIG. 1 is a block diagram of a computing device for performing an operation for determining an abnormal game play according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100.

The computing device 100 may include a network unit 110, a processor 120, and a memory 130. The computing device of the present disclosure may include a game server of a game service company.

The network unit 110 may transmit and receive data for performing the method for determining the abnormal game play according to an exemplary embodiment of the present disclosure to and from other computing devices, servers, and the like. The network unit 110 may transmit and receive data required according to an exemplary embodiment of the present disclosure such as a game play scene, etc., to and from other computing devices, servers, and the like. For example, the network unit 110 may receive the game play scene at a user terminal or the like. In addition, the network unit 110 may enable communication among a plurality of computing devices so that training of the model is distributively performed in each of the plurality of computing devices. The network unit 110 enables communication between a plurality of computing devices so that an operation for the presence or absence of an abnormal pattern may be distributedly processed on the game play scene using the model.

The processor 120 may be constituted by one or more cores and may include processors for data analysis and deep training, which include a central processing unit (CPU), a general purpose graphics processing unit (GPGPU), a tensor processing unit (TPU), and the like of the computing device. The processor 120 may read a computer program stored in the memory 130 to perform the method for determining the abnormal game play according to an exemplary embodiment of the present disclosure. According to the exemplary embodiment of the present disclosure, the processor 120 may perform a calculation for training the neural network. The processor 120 may perform calculations for training the neural network, which include processing of input data for training in deep training (DN), extracting a feature in the input data, calculating an error, updating a weight of the neural network using backpropagation, and the like.

At least one of the CPU, the GPGPU, and the TPU of the processor 120 may process training of the model. For example, both the CPU and the GPGPU may process the training of the model and an operation for the presence or absence of the abnormal pattern on the game play scene using the model. Further, in an exemplary embodiment of the present disclosure, the training of the model, a game interest calculation using a game interest determination model, and an event determination operation depending on a game interest using an event determination model may be processed by using the processors of a plurality of computing devices together. Further, the computer program executed in the computing device according to an exemplary embodiment of the present disclosure may be a CPU, GPGPU, or TPU executable program.

In an exemplary embodiment of the present disclosure, the computing device 100 may distribute and process the model by using at least one of the CPU, the GPGPU, and the TPU. Further, in an exemplary embodiment of the present disclosure, the computing device 100 may distribute and process the model processing together with other computing devices.

Hereinafter, the game play scene, which is an object for determining whether the play of the player is abnormally performed according to an exemplary embodiment of the present disclosure, will be described.

The processor 120 may compute the game play scene of the player using an abnormal game play determination model including one or more network functions. The processor 120 may receive data relating to the game play scene of the player from at least one of other computing device and the memory via the network unit 110. The game play scene may be at least a part of a game play image acquired in association with the game play of the player. The game play scene may be a scene acquired by capturing at least a part of the game play image at least at one time point.

A time point at which the game play scene for determining whether the play of the player is abnormally performed is generated may be based on at least one of a predetermined action and a predetermined time unit.

The predetermined action may include an action that may affect the winning or the defeat of the game among actions of the game player. The actions which may affect the winning or the defeat of the game may include using the skill of the game player, snooping another player, killing another player, acquiring an item, and the like. For example, the predetermined action may be an action in which the game player snoops another player, an action in which the game player acquires an item corresponding to an upper rank among the items, an invocation of the skill of another player, an attack to a boss mob, and the like. The detailed description of the predetermined action is just an example and the present disclosure is not limited thereto.

The play scene based on the predetermined time unit may be a scene generated by capturing the game play image of the game player at predetermined time intervals. The predetermined time unit may be a time unit determined based on a game play start time point of the game player or may be a time unit determined based on a time point of a game action of the game player. For example, the processor 120 may generate the play scene every one minute from the game play start time point with respect to the game play image of the game player. For example, the processor 120 may generate an image before or after a snooping time point at a 1-second interval based on an action in which the player snoops another player with respect to the game play image with respect to the game play image of the game layer. The detailed description of the predetermined time unit is just an example and the present disclosure is not limited thereto.

An area of the game play scene for determining whether the play of the player is abnormally performed may be generated based on at least one of the entire game play scene display in the player, at least a part of the game play scene determined based on a genre of the game, at least a part of the game play scene determined based on game data, and at least a part excluding game information from the game play scene.

The game play scene generated based on the entirety of the game play scene may include an entire scene which the game player watches to play the game. That is, the game play scene may include the entire scene displayed to the player. For example, in the case of game genres including Aeon of Strife (AOS), Multiplayers Online Battle Arena (MOBA), Action Real Time Strategy (ARTS), and the like, since motions of the players or the actions of the players are included in the entire game play scene, the processor 120 may generate the game play scene based on the entire game play scene. For example, since game actions (in this example, using the skills of the players) of two or more users are included in the game play scene generated based on the entire game play scene, the processor 120 may determine whether the abnormal game play exists with respect to the game actions of the players based on the game play scene. The detailed description of the game play scene generated based on the entire game play scene is just an example and the present disclosure is not limited thereto.

The processor 120 may generate the game play scene based on at least a part of the game play scene determined based on the game genre. The game genre may be a criterion classified based on a play mode of the game. For example, the game genre may be a first person shooter (FPS), an AOS game, a racing game, a rhythm game, and the like. The game play scene may be generated for a part based on a part where the abnormal play may be generated because a part where the abnormal play may be generated varies depending on the game genre. For example, in the case of the FPS game, the game play scene may include a part area of a scene center including an aim point because a partial point of the scene center including the aim point of the player is a position where a main event occurs in the game. Further, for example, when the game player himself/herself kills another player, since in which part another player is located on the scene is an important part in the game, the processor 120 may generate the game play scene based on a part at which another player is located. For example, in the case of the AOS game, since reducing the damage of the player by avoiding the skill of another player is an important part that may contend for victory in the game, the processor 120 may generate the game play scene based on a part where another player uses the skill. The detailed description of the method for generating the game play scene based on the game genre is just an example and the present disclosure is not limited thereto.

The processor 120 may generate at least a part of the game play scene based on the game data. The game data may include all data related to the game play. The game data may include data on the action of the game play. The processor 120 may generate the game play scene based on a peripheral area of the game data based on game data which is an area where the action of the game player is performed. For example, the game data may be the position of the item, a position of a part at which a gun aims, the position of another player, a coordinate of a part where the skill is used, etc. For example, when the game player throws a headshot to another player, the processor 120 may, based on the game data including coordinate information on a head of another player, generate the game play scene based on a head part of another player. For example, when another game player invokes the skill, the processor 120 may, based on the game data including the coordinate information in which another player uses the skill, generate the game play scene based on a part where the skill of another player is used. The detailed description of the game play scene generated based on the game data is just an example and the present disclosure is not limited thereto.

The game play scene may include at least a part excluding the game information. The game information may be a part for transferring data related to the game play to the game player. The game information may be a part that displays information related to a game play displayed at the same position of the game play scene even if a viewpoint of the game player is changed or the game player moves to another region or place. The part excluding the game information from the game play scene may include a game object and a background displayed according to the game play of the game player. The part excluding the game information from the game play scene may include a character, an item, a background scene, an action, and the like displayed based on the game play. For example, referring to FIG. 2, the part displaying the data related to the game play, which is the game information, may be a part 212 indicating how many players survive at present, a map 214 related to the game play, a coordinate 216 indicating a direction of the game player, etc. For example, the processor 120 may generate the game play scene based on at least a part of the remaining part excluding the game information (in this example, reference numerals 212, 214, and 216). The detailed description of the generation of the game play scene based on the part excluding the game information is just an example and the present disclosure is not limited thereto.

The processor 120 may compute the game play scene using an abnormal game play determination model. The processor 120 may determine whether the abnormal pattern exists on the game play scene based on the output of the abnormal game play determination model.

The abnormal pattern may include pattern information different from normal pattern information related to the game displayed on a normal game play scene. The abnormal pattern may include pattern information additionally displayed to overlap with a normal game play scene. For example, the abnormal pattern may include a pattern in which information for assisting the game play is displayed to overlap on the scene by installing a program for hacking the game server and performing the game play by the game player. For example, a play scene of a player using a game nucleus in the FPS game may include an abnormal pattern for displaying a player positioned behind a wall that is not displayed in the normal game play scene, and an abnormal pattern for displaying item information outside a predetermined range. For example, the play scene of the player who uses the game nucleus in the AOS game may include an abnormal pattern for displaying a range on which a skill influence of another player not displayed is exerted on the normal game play scene, etc.

The processor 120 may determine whether the play of the player is abnormally performed based on whether the abnormal pattern exists on the game play scene. When the play is abnormally performed, the processor 120 may impose a penalty to the corresponding player. The penalty may include restricting the game play to the player who performs the abnormal game play. For example, the penalty may include a constraint that prevents the game from being performed during a predetermined period, a constraint that prevents the game from being performed permanently, a constraint that prevents a specific item from being acquired for a predetermined time for which the corresponding time is performed, a constraint that prevents another player from being hit for a predetermined time, and the like. The detailed description of the penalty is just an example and the present disclosure is not limited thereto.

The processor 120 may differently determine the penalty to be imposed to the game player based on an intensity of the abnormal pattern. The intensity of the abnormal pattern may mean a degree at which the abnormal pattern affects a game result. As a degree at which the game result is changed due to the use of the game nucleus is higher, the intensity of the abnormal pattern may be higher and as information in which the game result is changed due to the use of the game nucleus is lower, the intensity of the abnormal pattern may be lower. The processor 120 may determine that a higher-intensity abnormal pattern is found in the game play of the player when the game result is changed to a predetermined threshold value or more by use of the game nucleus and impose a higher-degree penalty to the game player. For example, the processor 120 may determine that an abnormal pattern indicating information of the item outside a predetermined area is a low-intensity abnormal pattern and impose to the game player a penalty for preventing the game player from acquiring the item for a predetermined time as the low-degree penalty. For example, a play scene of a player using a quadrangle that causes another player, which is generally not visible on the topography, to be displayed on the scene, may be determined to include a high-degree abnormality pattern and may impose to the game player a penalty for preventing the game player from accessing the game for a predetermined time as the high-degree penalty. The detailed description of the penalty and the intensity of the abnormal pattern is just an example and the present disclosure is not limited thereto.

When the processor 120 determines that the abnormal pattern exists on the game play scene as a result of the computation using one abnormal game play determination model, the processor 120 may reexamine whether there is the abnormal pattern on the game play scene using another abnormal game play determination model.

In the neural network, one or more nodes connected through the link may relatively form the relationship between an input node and an output node. Concepts of the input node and the output node are relative and a predetermined node which is in the output node relationship with respect to one node may have the input node relationship in the relationship with another node and vice versa. As described above, the relationship of the output node to the input node may be generated based on the link. One or more output nodes may be connected to one input node through the link and vice versa.

In the relationship of the input node and the output node connected through one link, a value of the output node may be determined based on data input in the input node. Here, a node connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form the input node and output node relationships in the neural network. A characteristic of the neural network may be determined according to the number of nodes, the number of links, correlations between the nodes and the links, and values of the weights granted to the respective links in the neural network. For example, when the same number of nodes and links exist and two neural networks in which the weight values of the links are different from each other exist, it may be recognized that two neural networks are different from each other.

The neural network may be configured to include one or more nodes. Some of the nodes constituting the neural network may constitute one layer based on distances from an initial input node. For example, an aggregation of nodes of which the number of distances from the initial input node is n may constitute an n layer. The distance from the initial input node may be defined by the minimum number of links required for reaching the corresponding node from the initial input node up to the corresponding node. However, definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean not the initial input node and the final output node but the nodes constituting the neural network. In the neural network according to an exemplary embodiment of the present disclosure, the number of nodes of the input layer may be larger than the number of nodes of the hidden layer close to the output layer, and the neural network may be a neural network of a type in which the number of nodes decreases as the layer progresses from the input layer to the middle hidden layer among one or more hidden layers. The layer of the interval in which the number of nodes decreases may be an encoder part. The neural network may be a neural network of a type in which as the layer progresses from the middle hidden layer to the output layer again among one or more hidden layers, the number of nodes increases. The layer of the interval in which the number of nodes increases may be a decoder part.

The abnormal play determination model trained based on at least one of a first training data set and a third training data set may include an autoencoder.

The autoencoder may mean a neural network including a plurality of hidden layers other than the input layer and the output layer. The number of nodes included in the input layer and the output layer of the autoencoder, respectively may be equal to each other. When the autoencoder is used, latent structures of the data may be determined. That is, characteristics of the data may be found in a state where only an input value of the data is given.

The autoencoder may reduce a dimension as the input data input into the input layer is propagated through the hidden layer of the encoder part. The autoencoder may increase the dimension as data of which dimension is reduced is propagated from the hidden layer of the decoder part through the output layer again. A reconstruction error may be computed based on the value of the output layer and the value of the input layer of the autoencoder. Weight values may be tuned by using the backpropagation based on the reconstruction error.

The abnormal play determination model trained based on the second training data set may include a convolutional neutral network.

A deep neural network (DNN) may refer to a neural network that includes a plurality of hidden layers in addition to the input and output layers. When the deep neural network is used, the latent structures of data may be determined. In other words, latent structures (e.g., what objects are in the picture, what the content and feelings of the text are, what the content and feelings of the voice are) of photos, text, video, voice, and music may be determined. The deep neural network may include a convolutional neural network (CNN), a recurrent neural network (RNN), a restricted Boltzmann machine (RBM), a deep belief network (DBN), a Q network, a U network, a Siam network, and the like.

The convolutional neural network (CNN) as a type of deep neural network includes a neural network that includes a convolutional layer. The convolutional neural network is a type of multilayer perceptron designed to use minimal preprocessing. The CNN may be constituted by one or more convolutional layers and artificial neural network layers associated therewith and may additionally use the weight and pooling layers. Such a structure allows the CNN to fully utilize the input data of a two-dimensional structure. The convolutional neural network may be used for recognizing an object in an image. The convolutional neural network may represent and process image data as a matrix having the dimension. For example, in the case of image data encoded in red-green-blue (RGB), the image data may be represented as a two-dimensional (for example, a two-dimensional image) matrix for each of R, G, and B colors. That is, a color value of each pixel of the image data may become a component of the matrix and a size of the matrix may be equal to the size of the image. Accordingly, the image data may be represented by three two-dimensional matrix (three-dimensional data array). A description of a detailed configuration for the convolutional neural network is discussed in more detail in US Patent Registration U.S. Pat. No. 9,870,768B2, the entire contents of which are incorporated herein by reference in this application.

Hereinafter, the abnormal game play determination model trained to identify the pattern of the normal play scene according to an exemplary embodiment of the present disclosure will be described.

The abnormal game play determination model may include one or more artificial neural networks and may be trained with a first training data set configured by the normal game play scene so as to identify the pattern of the normal game play scene related to the normal game play and may detect whether a pattern which is not trained exists on the game play scene.

The processor 120 may acquire the first training data set. The first training data set may include training normal game play scenes of the players, which do not include the abnormal pattern. The first training data set may include the training normal game play scene which does not include the abnormal pattern. The training normal game play scene may be a scene in which at least a part of an image in which players who do not use the game nucleus play the game is captured at least at one time point. The processor 120 may set the training normal game play scene as the input of the abnormal game play determination model. The object may include objects related to the game play included in the game play scene. The object may include all objects included in the scene, which affect the game play. For example, the object may be a geographic feature (i.e., a brick, a tree, a wall, a cabin, a fence, etc.), a player, an item, etc., of the game, which are included in the game play scene. Object information may be information for distinguishing one kind of object from another kind of object from each other. The detailed description of generation of the first training data set is just an example and the present disclosure is not limited thereto.

The processor 120 inputs a training normal game play scene of training data into a model in order to generate the abnormal game play determination model and compares a reconstructed normal game play scene computed by the abnormal game play determination model and a training abnormal game play determination model to calculate the reconstruction error. The processor 120 may adjust the weight of the abnormal game play determination model based on the error by a backpropagation method. The processor 120 may set a drop out so as to prevent a part of the output of the hidden node from being transferred to a next hidden node in order to prevent overfitting in training of the neural network. The processor 120 may set a training rate to be high at the beginning of the training and set the training rate to be low with the progress of the training for training efficiency.

The processor 120 may compute the game play scene as the input of the trained abnormal game play determination model. The processor 120 may check whether the abnormal game play exists based on the output of the abnormal game play determination model. The processor 120 may compare the output of the abnormal play determination model and the game play scene. When the abnormal pattern, rather than the normal pattern trained by the abnormal game play determination model, is included in the object of the game play scene as the input data, it may be difficult for the abnormal game play determination model to restore the abnormal pattern of the game play scene. The processor 120 may determine that the abnormal pattern is included when the output of the abnormal play determination model has a difference of a threshold value or more from the game play scene. In the present disclosure, the abnormal pattern may be a pattern not included in the normal game play scene. For example, the abnormal pattern may include untrained objects. The abnormal pattern may include at least one of an object shape (i.e., an unnatural rectangle, a straight line) different from the pattern of the trained object and an object color indicated by a color with high visibility different from the pattern of the trained object.

Figure 3:
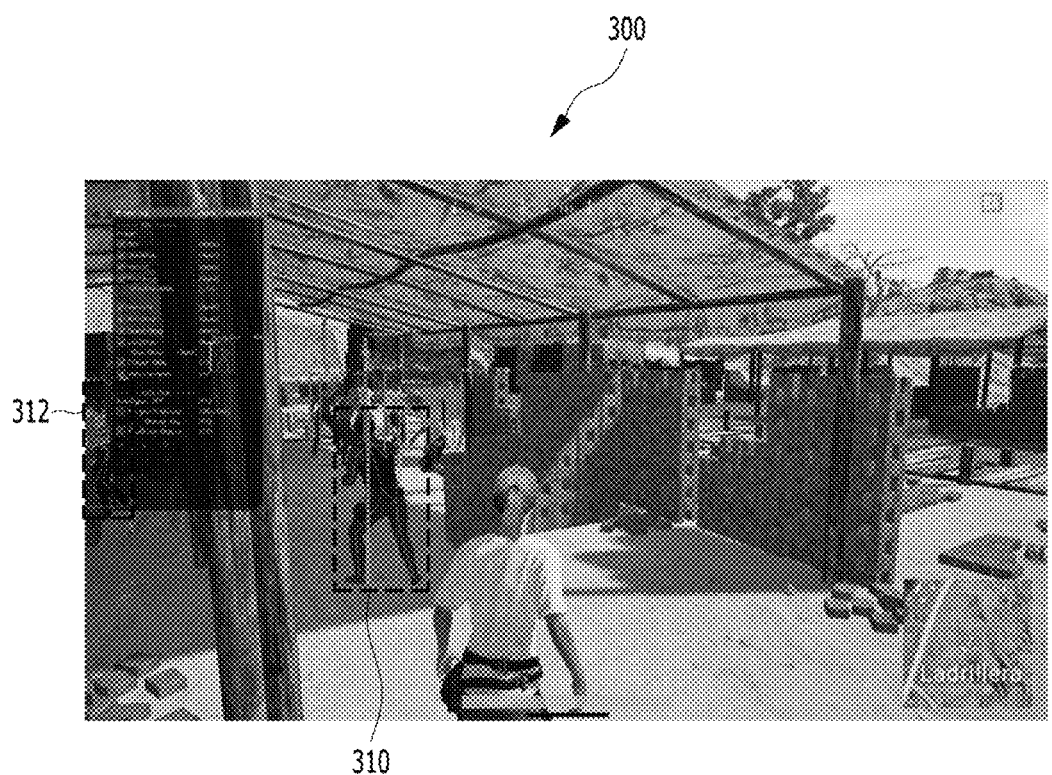
FIG. 3 is a diagram illustrating an abnormal game play scene according to an exemplary embodiment of the present disclosure.

For example, referring to FIG. 3, the processor 120 may compute a game play scene 300 through the trained abnormal game play determination model. The game play scene 300 may include abnormal patterns 310 and 312 including a fluorescent green square having high visibility with respect to the player as the object on the scene or abnormal patterns 310 and 312 including lines of a skeleton structure. Alternatively, the game play scene 300 may include an abnormal pattern including a fluorescent green line (i.e., a pattern for indicating that the opponent player is located beyond the wall) with high visibility with respect to a brick wall that is the object on the game play scene. The abnormal game play determination model does not train feature extraction and restoration on the game play scene including the abnormal pattern in advance, and as a result, a reconstruction game play scene output by inputting the game play scene including the abnormal pattern may have an error from the input game play scene. When the reconstruction game play scene (i.e., output) and the game play scene (i.e., input) have a difference of a threshold or more from each other, the game play scene includes a pattern other than the normal pattern, and as a result, the processor 120 may determine that the play of the player is abnormally performed (i.e., that the game nucleus is used). The detailed description of the object is just an example and the present disclosure is not limited thereto.

Hereinafter, the abnormal game play determination model trained to identify the color pattern of the normal play scene according to an exemplary embodiment of the present disclosure will be described.

The abnormal game play determination model may train the color pattern of the normal game play scene by using the first training data set and detect the abnormal game play based on whether an untrained color pattern exists on the game play scene.

The processor 120 may acquire the first training data set. The first training data set may include color information of the training normal game play scenes of the players, which does not include the abnormal pattern. The color information may include information for distinguishing one color from another color. The processor 120 may set the training normal game play scene as the input of the abnormal game play determination model. The detailed description of generation of the first training data set is just an example and the present disclosure is not limited thereto.

The processor 120 inputs the training normal game play scene of the training data into the model in order to generate the abnormal game play determination model and compares the color information (i.e., output) of the reconstruction normal game play scene computed by the abnormal game play determination model and color information (i.e., correct answer) of the training abnormal game play determination model to calculate the reconstruction error. The processor 120 may adjust the weight of the abnormal game play determination model based on the error by the backpropagation method.

The processor 120 may compute the game play scene as the input of the trained abnormal game play determination model. The processor 120 may check whether the abnormal game play exists based on the output of the abnormal game play determination model. The processor 120 may compare the output of the abnormal play determination model and the game play scene. When untrained color information as the abnormal pattern, rather than the normal pattern of the color information trained by the abnormal game play determination model, is included in the game play scene as the input data, it may be difficult for the abnormal game play determination model to restore the abnormal pattern of the game play scene. The processor 120 may determine that the abnormal pattern is included when the output of the abnormal play determination model has a difference of a threshold value or more from the game play scene. The abnormal pattern may include a color pattern different from an untrained color pattern.

For example, referring to FIG. 3, the game play scene 300 may include color information of the abnormal pattern other than color information (in this example, color information on the brick, color information on a dark green based color of a grass, color information on a face of a person, and the like) of the trained normal pattern. For example, the game play scene 300 may include abnormal patterns 310 and 312 that include color information regarding fluorescent green with high visibility. Since the abnormal game play determination model does not train restoration of the game play scene including the color information for the abnormal pattern in advance, the abnormal game play determination model may not normally restore the game play scene with the reconstruction game play scene output by inputting the game play scene including the color information on the abnormal pattern. The detailed description of the color pattern is just an example and the present disclosure is not limited thereto.

Hereinafter, the abnormal game play determination model trained to identify an object edge pattern of the normal play scene according to an exemplary embodiment of the present disclosure will be described.

The abnormal game play determination model may train an edge of the object of the normal game play scene by using the first training data set and detect the abnormal game play based on whether the edge pattern of the untrained object exists with respect to the detected object on the game play scene.

The processor 120 may acquire the first training data set. The first training data set may include the edge of the object included in the training normal game play scenes of the players, which do not include the abnormal pattern. The edge for each of one or more objects included in the training normal game play scene may be extracted by using an image processing algorithm. The image processing algorithm may include canny edge detection, Harris corner detection, and the like, but the present disclosure is not limited thereto. Through the canny edge detection, the processor 120 blurs the training normal game play scene to remove noise, detects the edge using a mask edge, removes a non-maximum value, and distinguishes a size by Double Threshold and connects the edge to extract the edge. The edge for each of one or more objects having a predetermined pixel thickness may be extracted from the training normal game play scene by using an image processing algorithm technique. For example, the training data may be a training normal game play scene including the edge of a grenade as the item, the edge for the game player, and the like. The detailed description of generation of the first training data is just an example and the present disclosure is not limited thereto.

The processor 120 inputs the training normal game play scene of the training data into the model in order to generate the abnormal game play determination model and compares object edge information (i.e., output) of the reconstruction normal game play scene computed by the abnormal game play determination model and object edge information (i.e., input) of the training abnormal game play determination model to calculate the reconstruction error. The processor 120 may adjust the weight of the abnormal game play determination model based on the error by the backpropagation method.

The processor 120 may compute the game play scene as the input of the trained abnormal game play determination model. The processor 120 may check whether the abnormal game play exists based on the output of the abnormal game play determination model. The processor 120 may compare the output of the abnormal play determination model and the game play scene. When an untrained object edge as the abnormal pattern, rather than the normal pattern for the edge of the object trained by the abnormal game play determination model, is included in the game play scene as the input data, it may be difficult for the abnormal game play determination model to restore the abnormal pattern of the game play scene. The processor 120 may determine that the abnormal pattern is included when the output of the abnormal play determination model has a difference of a threshold value or more from the game play scene. The abnormal pattern may include a pattern in which an edge other than the edge of the trained normal pattern exists in the object.

For example, in the AOS game, when a nucleus to indicate the range of influence of the skills used by other players is used, in a case where another player uses the skill near a rock, at least a part of a circular line based on the nucleus to indicate the influence range of the skill may be overlapped and displayed on the rock. Since the abnormal game play determination model trains the edge pattern for a rock object, the game play scene including the abnormal pattern in which at least a part of the circular line based on the nucleus is overlapped and displayed in the rock object may be difficult to reconstruct normally. When the reconstructed game play scene may not be normally reconstructed due to the abnormal pattern and thus has a difference of a threshold or more from an input game play scene, the processor 120 may determine that the abnormal pattern is included in the game play scene. The detailed description of the object edge is just an example and the present disclosure is not limited thereto.

Hereinafter, the abnormal game play determination model trained to identify the object of the normal play scene and the color pattern of the object according to an exemplary embodiment of the present disclosure will be described.

The abnormal game play determination model may train the object of the normal game play scene and the color pattern of the object by using the first training data set and detect the abnormal game play based on whether the color pattern of the untrained object exists on the game play scene with respect to the detected object.

The processor 120 may acquire the first training data set. The first training data set may include the objects of the training normal game play scenes of the players and color information on the objects, which do not include the abnormal pattern. The color information on the object may be color information on the color included in each object. For example, the training normal game play scene including the color information included in the object for a rock geographical feature object may be an input of the abnormal game play determination model. The detailed description of generation of the first training data set is just an example and the present disclosure is not limited thereto.

The processor 120 inputs the training normal game play scene of the training data into the model in order to generate the abnormal game play determination model and compares the color information (i.e., output) for each object of the reconstruction normal game play scene computed by the abnormal game play determination model and color information (i.e., correct answer) for each object of the training abnormal game play determination model to calculate the reconstruction error. The processor 120 may adjust the weight of the abnormal game play determination model based on the error by the backpropagation method.

The processor 120 may compute the game play scene as the input of the trained abnormal game play determination model. The processor 120 may check whether the abnormal game play exists based on the output of the abnormal game play determination model. The processor 120 may compare the output of the abnormal play determination model and the game play scene. When untrained color information for the object as the abnormal pattern, rather than the normal pattern of the color information for each object trained by the abnormal game play determination model, is included in the game play scene as the input data, it may be difficult for the abnormal game play determination model to restore the abnormal pattern of the game play scene. The processor 120 may determine that the abnormal pattern such as a fluorescent color with high visibility is included in the object when the output of the abnormal play determination model has a difference of a threshold value or more from the game play scene. The detailed description of the abnormal pattern is just an example and the present disclosure is not limited thereto.

For example, a vital point of another player is not displayed in a game scene which is normally played, but when the game nucleus is used, the head part of another player is displayed in a different color (e.g., a red color with high visibility) in order to assist the player in hitting another player. For example, when the game play scene is computed and output through the abnormal game play model, which includes a case where the head part of another player is displayed in the red color with high visibility, it may be difficult to restore the game play scene due to the color information of the abnormal pattern other than the color information trained with respect to the object of the game player. When the game play scene is not normally restored due to the color pattern displayed with the red color having high visibility, which is displayed in the head part of another player, the processor 120 may determine that the game play scene includes the abnormal pattern and determine that the play of the player is abnormally performed (i.e., the game nucleus is used). The detailed description of the object color information is just an example and the present disclosure is not limited thereto.

Hereinafter, the abnormal game play determination model trained to identify the pattern of the abnormal play scene according to an exemplary embodiment of the present disclosure will be described.

The abnormal game play determination model may be trained as the second training data set including the normal game play scene so as to identify the pattern of the abnormal game play scene related to the abnormal game play and may detect whether the trained abnormal pattern exists on the game play scene.

The processor 120 may acquire the second training data set. The second training data set may include training abnormal game play scenes of the players and training data in which the abnormal object of the training abnormal game play scene is labeled. The training abnormal game play scene may be a scene in which at least a part for the abnormal object of an image in which players who use the game nucleus play the game is captured at least at one time point. The processor 120 inputs the training abnormal game play scene as the input of the model and labels the abnormal object information for each of one or more abnormal objects included in the training abnormal game play scene to generate the training data. The abnormal object may be layering a display that assists the game of the player on the normal game play scene by playing the game by hacking the game server through a game nucleus program. The abnormal object information may include information for distinguishing one kind of abnormal object from another kind of abnormal object from each other. For example, when the game nucleus represents another player beyond a geographical feature (for example, a wall, a cabin, a concrete) that is not visible in the normal play scene, the abnormal object may be a rectangle for displaying another player beyond the geographical feature, a form in which another player is painted with a color having high visibility, or a line displaying the skeleton structure of another player. For example, when the game nucleus indicates the range of influence of the skill of another player, the abnormal object may be a circle or an elliptical line displayed when the skill of another player is used. For example, the training data may be acquired by labeling information on a quadratic nucleus with respect to the quadratic nucleus (in this example, a game nucleus that indicates the player or the like beyond the geographical feature) represented by a quadrangle. The detailed description of generation of the second training data set is just an example and the present disclosure is not limited thereto.

The processor 120 inputs the training abnormal game play scene of the training data into the model in order to generate the abnormal game play determination model and compares abnormal object information (i.e., output) computed by the abnormal game play determination model and abnormal object information (i.e., correct answer) as the label to calculate the error. The processor 120 may adjust the weight of the abnormal game play determination model based on the error by the backpropagation method.

The processor 120 may compute the game play scene as the input of the trained abnormal game play determination model. The processor 120 may check whether the abnormal game play exists based on the output of the abnormal game play determination model. The processor 120 may determine that the abnormal pattern is included when the abnormal object information trained by the abnormal game play determination model is output from the game play scene.

For example, the processor 120 may compute the game play scene 300 through the trained abnormal game play determination model. When the output computed through the trained abnormal game play determination model includes a rectangular or person-shaped straight-line object 310 as the trained abnormal object, the processor 120 may determine that the trained pattern exists on the game play scene 300 to determine that the abnormal pattern is included. The detailed description of the abnormal object is just an example and the present disclosure is not limited thereto.

The processor 120 may continuously train the abnormal game play determination model based on a new game nucleus (i.e., a new abnormal object type). When the new abnormal object type is detected through the game server, the processor 120 may continuously train the abnormal game play determination model based on an additional training data set including additional training data acquired by labeling new abnormal object information with respect to a new abnormal object.

Hereinafter, a method for detecting the abnormal game play by extracting positional information of the abnormal pattern and comparing the abnormal pattern and the game data by the processor 120 according to an exemplary embodiment of the present disclosure will be described.

The abnormal game play determination model may extract the positional information of the abnormal pattern on the game play scene and detect the abnormal game play based on a comparison result of the positional information of the abnormal pattern and the game data.

The abnormal game play determination model according to an exemplary embodiment of the present disclosure is trained by the first training data set configured by the normal game play scene so as to identify the pattern of the normal game play scene related to the normal game play to detect whether the untrained pattern exists on the game play scene or trained by the second training data set including the abnormal game play scene so as to identify the pattern of the abnormal game play scene related to the abnormal game play to detect whether the trained abnormal pattern exists on the game play scene.

The processor 120 may detect whether the abnormal pattern exists by setting the game play scene as the input of the abnormal game play determination model. The processor 120 may determine the positional information of the abnormal pattern when the abnormal pattern exists on the information output through the abnormal game play determination model. The positional information of the abnormal pattern may be identified based on a position where the positional information is not normally restored on the game play scene in the case of the abnormal play determination model trained by the first training data set. The positional information of the abnormal pattern may be identified based on a position where the trained abnormal object is identified in the case of the abnormal play determination model trained by the second training data set. The positional information of the abnormal pattern may be information on in which part of the game play scene the abnormal object is displayed. For example, when the game nucleus also indicates information on the item which is outside a predetermined distance, the positional information of the abnormal pattern may be a coordinate regarding in which part of the game play scene the information on the item is displayed with respect to the abnormal pattern displaying the information on the item. The detailed description of the positional information of the abnormal pattern is just an example and the present disclosure is not limited thereto.

The processor 120 may acquire the game data from the memory 130 of the computing device 100 (the server of the game company in the present disclosure). The game data may include positional information on the object of the game. The object of the game may include only a game object in which the degree which influences the game play is equal to or more than a threshold or include all objects. For example, the object of the game may include the player, the item, a weapon, and the like. For example, the game data may information regarding in which part of the game play scene the item is displayed or information regarding in which part of the game play scene the player is displayed. The information on the game data is just an example and the present disclosure is not limited thereto.

The processor 120 may compare the positional information of the abnormal pattern and the game data. The processor 120 may determine that the abnormal game play exists on the game play scene when the position of the abnormal pattern and the position of the object included in the game data are equal to each other or have a difference of a threshold or less from each other.

For example, in the normal game play scene, only item information within a predetermined radius range may be displayed based on the game player. When the positional information of the abnormal pattern (in this example, a phrase indicating the item information or a rectangle indicating an item position) of the abnormal pattern extracted by the processor 120 includes positional information regarding a range outside the predetermined radius range based on the game player and item position information included in the game data coincides with the positional information of the abnormal pattern, the processor 120 may determine that the game nucleus displaying the item information outside a predetermined radius is used.

For example, in the normal play scene, when the game player himself uses the skill, the range that affects another player is displayed, but when another player uses the skill, the range that influences yet another player may not be displayed. When the positional information of the abnormal pattern (in this example, an oval shape indicating a skill influence range) extracted by the processor 120 and positional information regarding the influence range of the skill used by another player included in the game data coincide with each other, the processor 120 may determine that the game nucleus displaying the skill influence range of another player is used.

The detailed description of a method for comparing the positional information of the abnormal pattern and the game data is just an example and the present disclosure is not limited thereto.

Hereinafter, a method for detecting the abnormal pattern by computing each object included in the game play scene through each submodel included in the abnormal play determination model by the processor 120 according to an exemplary embodiment of the present disclosure will be described.

The abnormal game play determination model may include one or more abnormal game play determination submodels trained to detect the abnormal pattern with respect to each object identified by the third training set including third training data subsets each constituted by the normal objects based on one or more objects included in the normal game play scene related to the normal game play.

The processor 120 may acquire the third training data set including the third training data subset for each object. The third training data subset may include training normal game play scenes of the players for each object. The processor 120 may set the training normal game play scene as the input of the model and generate the training data with respect to one kind of object included in the training normal game play scene. For example, the processor 120 may generate the third training data subset with respect to a bulletproof vest object among the items included in the training normal game play scene. The processor 120 may generate the third training data subset matched with each of one or more objects. The detailed description of generation of the third training data subset is just an example and the present disclosure is not limited thereto.

The processor 120 inputs the training normal game play scene of the training data included in the third training data subset into the model in order to generate the abnormal game play determination model and compares the object (i.e., output) of the reconstruction normal game play scene computed by an abnormal game play determination submodel and object information (i.e., correct answer) of the training abnormal game play scene to calculate the reconstruction error. The processor 120 may adjust the weight of the abnormal game play determination submodel based on the error by the backpropagation method. The processor 120 may generate the abnormal game play determination model including the trained abnormal game play determination submodel for each object.

The abnormal game play determination model detects one or more objects of the game play scene and computes each detected object through each abnormal game play determination submodel to detect whether the untrained pattern exists in each object.

The processor 120 may compute the game play scene as the input of the trained abnormal game play determination model. The processor 120 may compute each of the objects included in the game play scene as the input of the game play determination submodel matched with the object. The processor 120 may detect whether the abnormal pattern exists based on the output of the abnormal game play determination submodel.

For example, the abnormal game play determination submodel may include a submodel for a gun item object, a submodel for a player object, a submodel for a cabin object, and so on. The processor 120 may compute each of one or more objects included in the game play scene through the abnormal game play determination submodel matched with the object and check whether the abnormal game play exists based on the output of the abnormal game play determination submodel. The processor 120 may determine that the abnormal pattern exists in the game play scene when each object is not properly restored by the abnormal game play determination submodel. In the normal play scene, the player behind the concrete wall may not be displayed on the game play scene. In the game play scene of the game player using the game nucleus, the player behind the concrete wall may be displayed as a skeleton structure line (i.e., an abnormal pattern). The processor 120 may compute the object in the game play scene through the abnormal game play submodel for each object and the game player or the geographical feature (e.g., a brick wall, etc.) that includes the skeleton structure line may not be restored to be the same as the object included in the input game play scene. The processor 120 may determine that the object included in the game play scene is the abnormal pattern when the object included in the game play scene is not normally restored by the submodel. The detailed description of the abnormal game play determination submodel is just an example and the present disclosure is not limited thereto.

Figure 2:
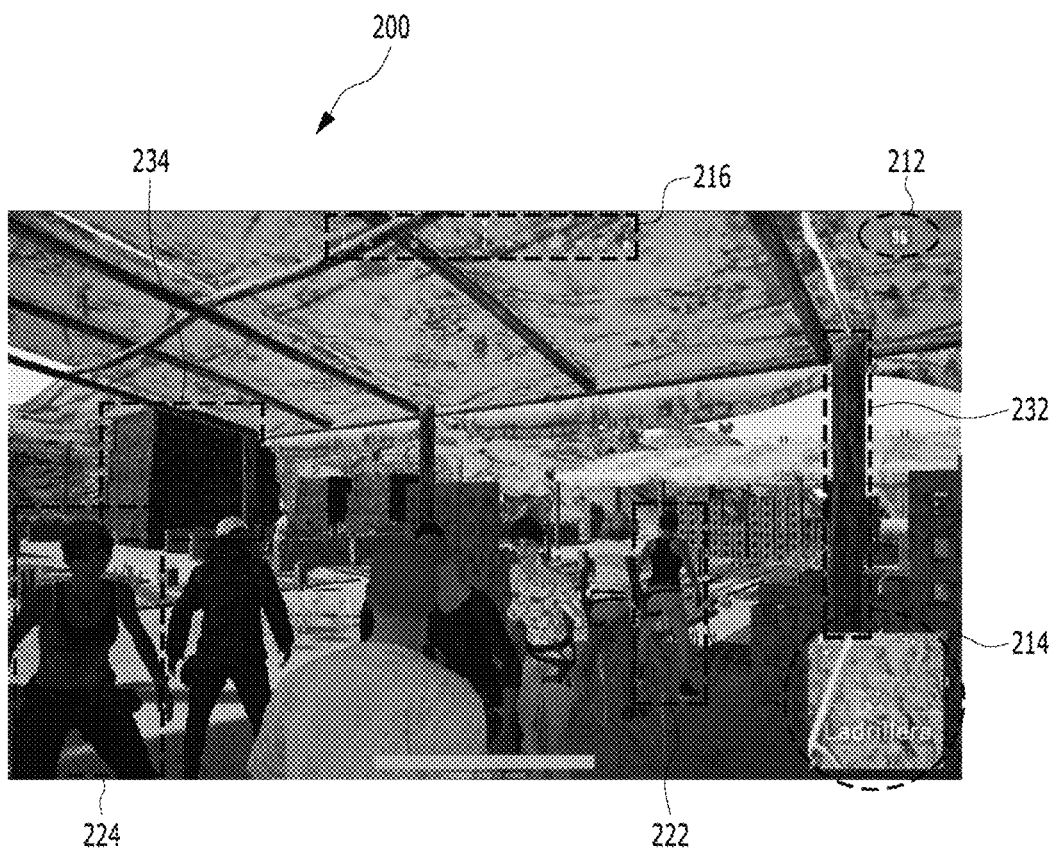
FIG. 2 is a diagram illustrating a normal game play scene according to an exemplary embodiment of the present disclosure.

FIG. 2 is a diagram illustrating a normal game play scene 200 according to an exemplary embodiment of the present disclosure.

The normal game play scene 200 of FIG. 2 may be a training normal game play scene 200 for training the abnormal game play determination model. The training normal game play scene 200 may be a scene in which at least a part of an image in which players who do not use the game nucleus play the game is captured at least at one time point.

According to an exemplary embodiment of the present disclosure, the training normal game play scene 200 may be a scene excluding game information on the game play scene. The game information may be a part for transferring data related to the game play to the game player. For example, the game information in the game play scene may include a part 212 indicating how many players survive at present, a map 214 related to the game play, a coordinate 216 indicating a direction of the game player, etc. For example, the part excluding the game information 212, 214, and 216 as the game information from the training normal game play scene 200 may include a character, an item, a background scene, an action, and the like displayed based on the game play.

The abnormal game play determination model may include one or more abnormal game play determination submodels. Each of the abnormal game determination submodels may detect the abnormal pattern based on the game play scene itself, each object included in the game play scene, color information, the edge of the object, or the color information of the object. Each of abnormal game determination submodels may detect the abnormal pattern based on other object types. For example, the object may include objects 214 and 222 for the player or a brick wall object 234 for the geographical feature or a column object 232 for the geographical feature.

In other words, the abnormal game play determination model may be a model trained to restore the normal pattern of the normal game play scene and the processor 120 may compute the reconstruction error through the comparison of the input data and the output data of the abnormal game play determination model, determine whether a pattern other than the normal pattern exists on the input game play scene based on the computed reconstruction error, and determine the corresponding game play as the abnormal game play when the pattern other than the normal pattern exists.

The abnormal game play determination model may include a plurality of abnormal game play determination submodels training the abnormal pattern for each object of the game. In the case of the game of the genre such as the FPS, etc., when the normal game play scene is used as the training data, a normal data set may indefinitely increase according to the position, the viewpoint, etc., of the player and in this case, a difficulty of the training may occur. For example, in the case of the FPS game, each game play scene may be included in the training data set since the game play scene may be displayed completely differently when the player views the same object from different directions.

That is, when the player views the same object in different directions, the game play scene may be displayed completely differently and all the normal patterns of each game play scene should be trained by the abnormal game play determination model, and as a result, an image related to the normal pattern may be constituted by sub sets of the training data for each object on the game in order to define the training data included in the training data set. For example, a school is extracted on the game scene of the player using the abnormal game play determination submodel that trains the abnormal pattern of an image for a specific building (e.g., school) on the game and the image for the specific building is processed by using the abnormal game play determination submodel training the normal pattern of the school to detect whether an untrained new pattern exists on the object named "school".

The processor 120 inputs the training normal game play scene 200 of the training data into the model in order to generate each abnormal game play determination model and compares the reconstructed game play scene (i.e., output) and the training normal game play scene (i.e., correct answer) computed by the abnormal game play determination model to calculate the reconstruction error. The processor 120 may adjust the weight of the abnormal game play determination model based on the reconstruction error by the backpropagation method.

The processor 120 may compute the game play scene as the input of the trained abnormal game play determination model. The processor 120 may check whether the abnormal game play exists based on the output of the abnormal game play determination model. When the game play scene includes the abnormal pattern other than the pattern of at least one of the trained object, color information, edge, etc., the reconstructed game play scene computed through the abnormal game play determination model may not be a normally restored scene. The processor 120 may determine that the abnormal pattern is included in the game play scene, which is input data of the model, when the difference between the reconstructed game play scene and the game play scene is equal to or more than a threshold. When the abnormal pattern other than the trained pattern is included in the game play scene, the processor 120 may determine that the play of the player is abnormally performed.

For example, referring to FIG. 3, since a fluorescent green rectangular pattern of FIG. 3 is not a pattern trained through the abnormal play determination model, when the game play scene 300 including the abnormal pattern is computed through the model, the reconstructed game play scene is not normally restored, and as a result, the difference from the game play scene 300 may be equal to or larger than a threshold. When the abnormal pattern exists, the processor 120 may determine that the play of the player is abnormally performed.

FIG. 3 is a diagram illustrating an abnormal game play scene 300 according to an exemplary embodiment of the present disclosure.

The processor 120 sets the training abnormal game play scene 300 as the input of the model and labels the abnormal object information for each of one or more abnormal objects included in the training abnormal game play scene 300 to generate the training data. The abnormal object may be layering a display that assists the game of the player on the normal game play scene by playing the game by hacking the game server through a game nucleus program.

For example, when the game nucleus represents another player beyond the geographical feature (e.g., wall, cabin, concrete) that is not visible on the normal play scene, the processor 120 may label the abnormal object information for abnormal patterns 310 and 312 which are fluorescent green rectangles around the player included in the training abnormal game play scene 300 or label the abnormal object information for abnormal patterns 310 and 312 including a fluorescent green line of the skeleton structure that displays the player.

The processor 120 may input the training abnormal game play scene 300 of the training data into the model in order to generate the abnormal game play determination model and compare abnormal object information (i.e., output) computed by the abnormal game play determination model and abnormal object information (i.e., correct answer) as the label to calculate the error. The processor 120 may adjust the weight of the abnormal game play determination model based on the error by the backpropagation method.

The processor 120 may compute the game play scene as the input of the trained abnormal game play determination model. The processor 120 may check whether the abnormal game play exists based on the output of the abnormal game play determination model. The processor 120 may determine that the abnormal pattern is included when the abnormal object information trained by the abnormal game play determination model is output from the game play scene.

For example, the abnormal game play determination model may be a model trained through teacher training by labeling the abnormal object information based on the game nucleus indicating the quadratic nucleus. When the fluorescent green line (i.e., the display for the trained quadratic nucleus) which is the trained abnormal pattern of FIG. 3 is detected by the abnormal game play determination model, it may be determined that the abnormal pattern is included in the game play scene.

In an exemplary embodiment of the present disclosure, the abnormal game play determination model may train the normal pattern on the game play scene and in this case, the computing device 100 detects whether the new untrained pattern (i.e., abnormal pattern) exists in the game play scene by using the abnormal game play determination model to detect the abnormal play of the player. In this case, the abnormal game play determination model may include one or more abnormal game play determination submodels configured to train the normal pattern of each object on the game to limit the number of training data. In the exemplary embodiment, it is possible to detect whether the player is using a new abnormal program that the player has not grasped on the side of a game operator by using the abnormal game play determination model in which the normal pattern on the game play scene is trained.

In another exemplary embodiment of the present disclosure, the abnormal game play determination model may train the abnormal pattern on the game play scene and in this case, the computing device 100 may detect the abnormal play of the player based on whether the abnormal pattern is detected in the game play scene by using the abnormal game play determination model. In the exemplary embodiment, it is possible to detect whether the player is using an abnormal program (e.g., a head part display nucleus for a head shot, etc.) that the player has grasped on the side of a game operator by using the abnormal game play determination model in which the abnormal pattern on the game play scene is trained.

In other words, in the present disclosure, when the pattern of the abnormal program is grasped on the side of the game operator, it is possible to detect the abnormal play more accurately by an object recognition method and by training even the normal pattern of the game play scene, it is also possible to monitor a new abnormal program which has not grasped on the side of the game operator.

Figure 4:
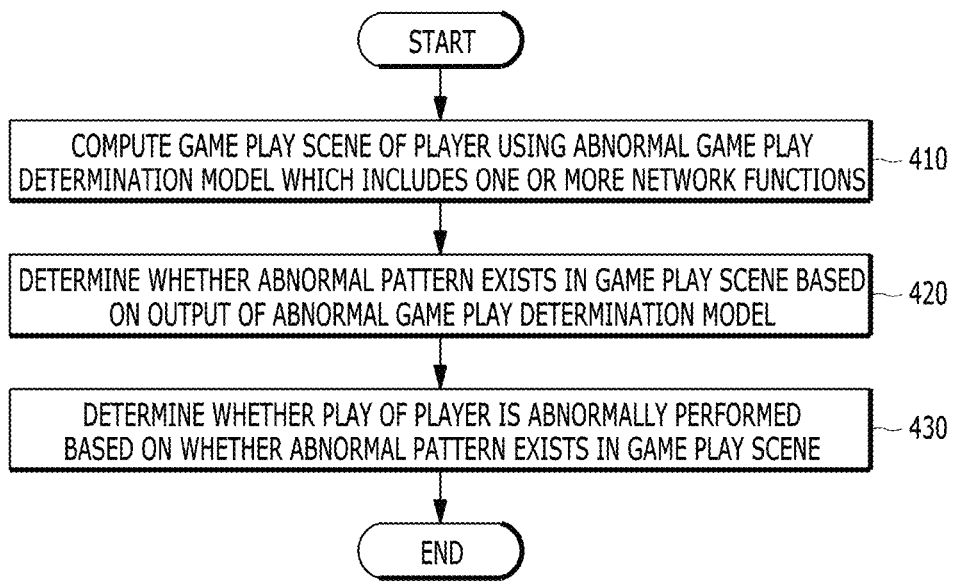
FIG. 4 is a flowchart of a method for determining an abnormal game play according to an exemplary embodiment of the present disclosure.

FIG. 4 is a flowchart of a method for determining an abnormal game play according to an exemplary embodiment of the present disclosure.

The computing device 100 may compute the game play scene of the player using an abnormal game play determination model including one or more network functions (410). The game play scene as at least a part of the game play image acquired in association with the game play of the player may be generated based on at least one of a predetermined action and a predetermined time unit. The game play scene may include at least one of the entire game play scene displayed in the player, at least a part of the game play scene determined based on a genre of the game, at least a part of the game play scene determined based on game data, and at least a part excluding game information from the game play scene.

The computing device 100 may determine whether the abnormal pattern exists on the game play scene based on the output of the abnormal game play determination model (420).

The abnormal game play determination model may be trained as the first training data set including the normal game play scene so as to identify the pattern of the normal game play scene related to the normal game play and may detect whether the untrained pattern exists on the game play scene. The first training data set may include training normal game play scenes of the players, which do not include the abnormal pattern. The training normal game play scene may be a scene in which at least a part of an image in which players who do not use the game nucleus play the game is captured at least at one time point.

The abnormal game play determination model may train the color pattern of the normal game play scene by using the first training data set and detect the abnormal game play based on whether the untrained color pattern exists on the game play scene.

The abnormal game play determination model may train an edge of the object of the normal game play scene by using the first training data set and detect the abnormal game play based on whether the edge pattern of the untrained object exists with respect to the detected object exists on the game play scene.

The abnormal game play determination model may train the object of the normal game play scene and the color pattern of the object by using the first training data set and detect the abnormal game play based on whether the color pattern of the untrained object exists on the game play scene with respect to the detected object.

The abnormal game play determination model may be trained as the second training data set including the abnormal game play scene so as to identify the pattern of the abnormal game play scene related to the abnormal game play and may detect whether the trained abnormal pattern exists on the game play scene. The second training data set may include training abnormal game play scenes of the players and training data in which the abnormal object of the training abnormal game play scene is labeled. The training abnormal game play scene may be a scene in which at least a part for the abnormal object of an image in which players who use the game nucleus play the game is captured at least at one time point.

The abnormal game play determination model may extract the positional information of the abnormal pattern on the game play scene and detect the abnormal game play based on a comparison result of the positional information of the abnormal pattern and the game data. The computing device 100 may determine that the abnormal game play exists on the game play scene when the position of the abnormal pattern and the position of the object included in the game data are equal to each other or have a difference of a threshold or less from each other.

The abnormal game play determination model may include one or more abnormal game play determination submodels trained to detect the abnormal pattern with respect to each object identified by the third training set including third training data subsets each constituted by the normal objects based on one or more objects included in the normal game play scene related to the normal game play and detect one or more objects of the game play scene and compute each detected object through each abnormal game play determination submodel to detect whether the untrained pattern exists in each object.

The computing device 100 may determine whether the play of the player is abnormally performed based on whether the abnormal pattern exists on the game play scene (430).

Figure 5:
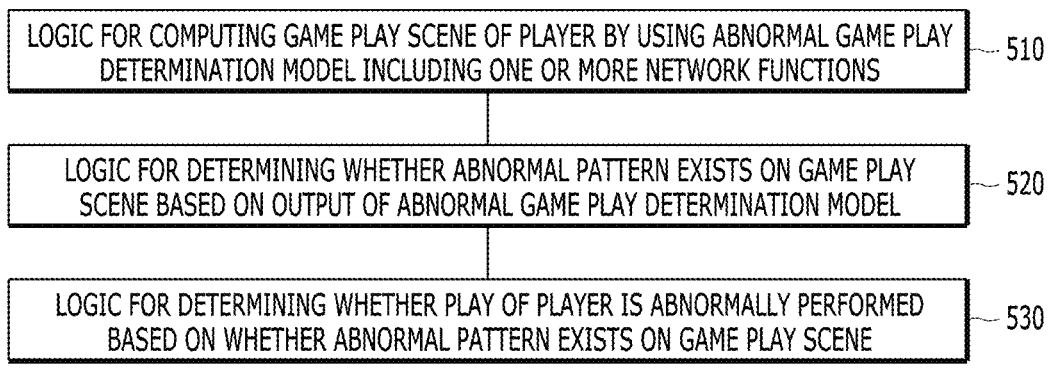
FIG. 5 is a block diagram illustrating a logic for implementing a method for determining an abnormal game play according to an exemplary embodiment of the present disclosure.

FIG. 5 is a block diagram illustrating a logic for implementing a method for determining an abnormal game play according to an exemplary embodiment of the present disclosure.

The method for determining the abnormal game play according to an exemplary embodiment of the present disclosure may be implemented by the following logics.

The method for determining the abnormal game play according to an exemplary embodiment of the present disclosure may be implemented by a logic 510 for computing a game play scene of a player by using an abnormal game play determination model including one or more network functions; a logic 520 for determining whether an abnormal pattern exists on the game play scene based on an output of the abnormal game play determination model; and a logic 530 for determining whether the play of the player is abnormally performed based on whether the abnormal pattern exists on the game play scene.

Figure 6:
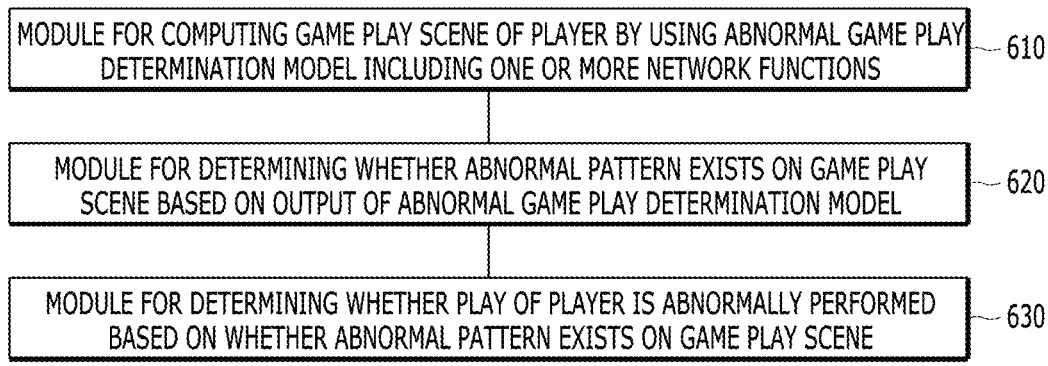
FIG. 6 is a block diagram illustrating a module for implementing a method for determining an abnormal game play according to an exemplary embodiment of the present disclosure.

FIG. 6 is a block diagram illustrating a module for implementing a method for determining an abnormal game play according to an exemplary embodiment of the present disclosure.

The method for determining the abnormal game play according to an exemplary embodiment of the present disclosure may be implemented by the following modules.

The method for determining the abnormal game play according to an exemplary embodiment of the present disclosure may be implemented by a module 610 for computing a game play scene of a player by using an abnormal game play determination model including one or more network functions; a module 620 for determining whether an abnormal pattern exists on the game play scene based on an output of the abnormal game play determination model; and a module 630 for determining whether the play of the player is abnormally performed based on whether the abnormal pattern exists on the game play scene.

Figure 7:
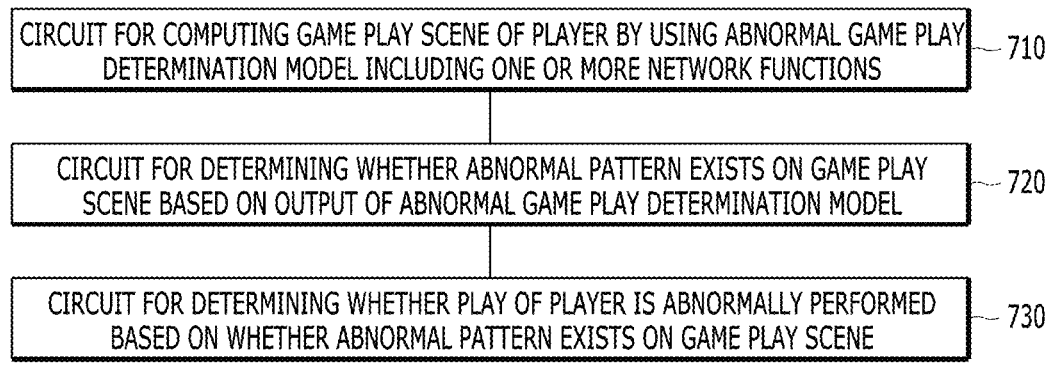
FIG. 7 is a block diagram illustrating a circuit for implementing a method for determining an abnormal game play according to an exemplary embodiment of the present disclosure.

FIG. 7 is a block diagram illustrating a circuit for implementing a method for determining an abnormal game play according to an exemplary embodiment of the present disclosure.

The method for determining the abnormal game play according to an exemplary embodiment of the present disclosure may be implemented by the following circuits.

The method for determining the abnormal game play according to an exemplary embodiment of the present disclosure may be implemented by a circuit 710 for computing a game play scene of a player by using an abnormal game play determination model including one or more network functions; a circuit 720 for determining whether an abnormal pattern exists on the game play scene based on an output of the abnormal game play determination model; and a circuit 730 for determining whether the play of the player is abnormally performed based on whether the abnormal pattern exists on the game play scene.

Figure 8:
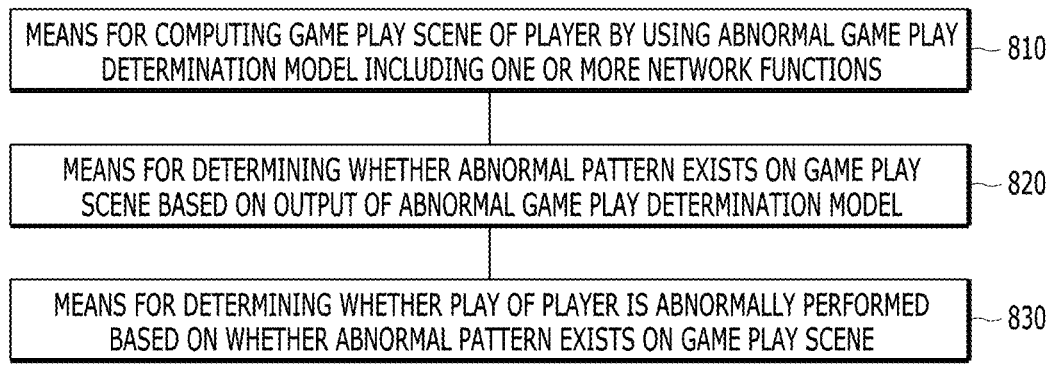
FIG. 8 is a block diagram illustrating a means for implementing a method for determining an abnormal game play according to an exemplary embodiment of the present disclosure.

FIG. 8 is a block diagram illustrating a means for implementing a method for determining an abnormal game play according to an exemplary embodiment of the present disclosure.

The method for determining the abnormal game play according to an exemplary embodiment of the present disclosure may be implemented by the following means.

The method for determining the abnormal game play according to an exemplary embodiment of the present disclosure may be implemented by a means 810 for computing a game play scene of a player by using an abnormal game play determination model including one or more network functions; a means 820 for determining whether an abnormal pattern exists on the game play scene based on an output of the abnormal game play determination model; and a means 830 for determining whether the play of the player is abnormally performed based on whether the abnormal pattern exists on the game play scene.

Figure 9:
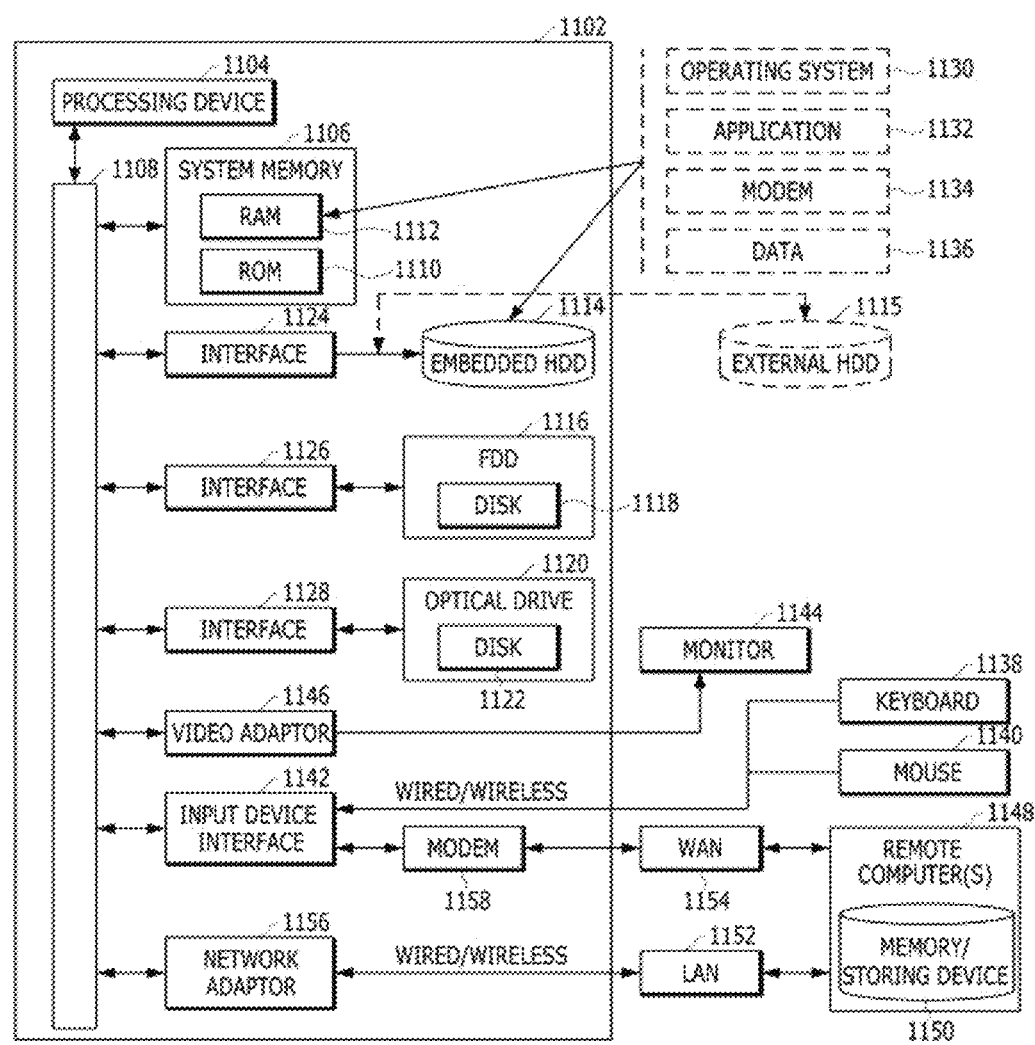
FIG. 9 is a block diagram of a computing device according to an exemplary embodiment of the present disclosure.

FIG. 9 is a block diagram of a computing device according to an exemplary embodiment of the present disclosure.

FIG. 9 illustrates a simple and general schematic view of an exemplary computing environment in which the exemplary embodiments of the present disclosure may be implemented.

The present disclosure has generally been described above in association with a computer executable instruction which may be executed on one or more computers, but it will be well appreciated by those skilled in the art that the present disclosure can be implemented through a combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devicesas well as a single-processor or multi-processor computer system, a mini computer, and a mainframe computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof. The computer readable media include volatile and non-volatile media, transitory and non-transitory media, and mobile and non-mobile media. As not a limit but an example, the computer readable media may include both computer readable storage media and computer readable transmission media. The computer readable storage media include volatile and non-volatile media, temporary and non-temporary media, and movable and non-movable media implemented by a predetermined method or technology for storing information such as a computer readable instruction, a data structure, a program module, or other data. The computer storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As not a limit but an example, the computer readable transmission media include wired media such as a wired network or a direct-wired connection and wireless media such as acoustic, RF, infrared and other wireless media. A combination of anymedia among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an internal hard disk drive (HDD) 1114 (for example, EIDE and SATA)—the internal hard disk drive (HDD) 1114 may also be configured for an external purpose in an appropriate chassis (not illustrated)—, a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in various operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch scene, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer (s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Various exemplary embodiments presented herein may be implemented as manufactured articles using a method, an apparatus, or a standard programming and/or engineering technique. The term "manufactured article" includes a computer program, a carrier, or a medium which is accessible by a predetermined computer readable device. For example, a computer readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein, but should be analyzed within the widest range which is consistent with the principles and new features presented herein.

What is claimed is:

1. A non-transitory computer readable medium storing a computer program, wherein when the computer program is executed by one or more processors of a computing device, the computer program performs operations for determining abnormal game play and the operations include:
   computing a game play scene of a player using an abnormal game play determination model which includes one or more network functions;
   determining whether an abnormal pattern exists in the game play scene based on an output of the abnormal game play determination model; and
   determining whether a play of the player is abnormally performed based on whether an abnormal pattern exists in the game play scene;
   wherein the abnormal game play determination model trains at least one of color pattern, an edge of an object or a color pattern of the object, of a normal game play scene using a first training data set.

2. The non-transitory computer readable medium according to claim 1, wherein the game play scene is at least a part of a game play image obtained with respect to game play of the player and is generated based on at least one of a predetermined action or a predetermined time unit.

3. The non-transitory computer readable medium according to claim 1, wherein the game play scene includes at least one of an entire game play scene displayed to the player, at least a part of a game play scene determined based on a genre of a game, at least a part of a game play scene determined based on a game data, or at least a part excluding a game information from a game play scene.

4. The non-transitory computer readable medium according to claim 1, wherein the abnormal game play determination model detects abnormal game play based on whether the untrained color pattern exists in the game play scene.

5. The non-transitory computer readable medium according to claim 1, wherein the abnormal game play determination model detects abnormal game play based on whether the untrained edge pattern of an object exists in the game play scene.

6. The non-transitory computer readable medium according to claim 1, wherein the abnormal game play determination model detects abnormal game play based on whether the untrained color pattern of the object exists on the game play scene.

7. The non-transitory computer readable medium according to claim 1, wherein the abnormal game play determination model is trained with a second training data set including an abnormal game play scene to identify a pattern of an abnormal game play scene related to an abnormal game play and detects whether a trained abnormal pattern exists in the game play scene.

8. The non-transitory computer readable medium according to claim 7, wherein the second training data set includes training data labeled as an abnormal object of the abnormal game play scene.

9. The non-transitory computer readable medium according to claim 1, wherein the abnormal game play determination model extracts a positional information of an abnormal pattern on the game play scene and detects abnormal game play based on a result of comparison between the positional information of the abnormal pattern and a game data.

10. The non-transitory computer readable medium according to claim 1, wherein the abnormal game play determination model includes one or more abnormal game play determination submodels, wherein the one or more abnormal game play determination submodel are trained to detect an abnormal pattern for each object which is identified with a third training data set based on one or more objects included in a normal game play scene related to a normal game play, the third training data set includes a third training data subset composed of each normal object, detects one or more objects of the game play scene, and detects whether an untrained pattern exists in each of the objects by calculating each of the detected objects through the abnormal game play determination submodel.

11. A method for determining abnormal game play, comprising:
    computing a game play scene of a player using an abnormal game play determination model which includes one or more network functions;
    determining whether an abnormal pattern exists in the game play scene based on an output of the abnormal game play determination model; and
    determining whether a play of the player is abnormally performed based on whether an abnormal pattern exists in the game play scene;
    wherein the abnormal game play determination model trains at least one of color pattern, an edge of an object or a color pattern of the object, of a normal game play scene using a first training data set.

12. A server for determining abnormal game play, comprising:
    a server including one or more cores; and
    a memory;
    wherein the processor is configured to:
    compute a game play scene of a player using an abnormal game play determination model which includes one or more network functions;
    determine whether an abnormal pattern exists in the game play scene based on an output of the abnormal game play determination model; and
    determine whether a play of the player is abnormally performed based on whether an abnormal pattern exists in the game play scene;
    wherein the abnormal game play determination model trains at least one of color pattern, an edge of an object or a color pattern of the object, of a normal game play scene using a first training data set.

* * * * *